US006751759B1

(12) United States Patent
Sun et al.

(10) Patent No.: US 6,751,759 B1
(45) Date of Patent: Jun. 15, 2004

(54) METHOD AND APPARATUS FOR PIPELINE HAZARD DETECTION

(75) Inventors: Xiao Sun, Austin, TX (US); Chi Duong, Austin, TX (US); Joseph P. Gergen, Manchaca, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 550 days.

(21) Appl. No.: 09/706,089

(22) Filed: Nov. 3, 2000

(51) Int. Cl.$^7$ ............................................... G06F 11/00
(52) U.S. Cl. .......................... 714/55; 714/32; 714/33; 703/19
(58) Field of Search ........................... 714/32, 33, 34, 714/37, 28, 55; 703/19; 712/219, 216

(56) References Cited

U.S. PATENT DOCUMENTS

| | | | | |
|---|---|---|---|---|
| 5,805,795 A | * | 9/1998 | Whitten | 714/38 |
| 5,926,622 A | * | 7/1999 | Hardin et al. | 714/33 |
| 6,061,643 A | * | 5/2000 | Walker et al. | 702/123 |
| 6,185,518 B1 | * | 2/2001 | Chen | 703/19 |
| 6,263,302 B1 | * | 7/2001 | Hellestrand et al. | 703/17 |
| 6,292,765 B1 | * | 9/2001 | Ho et al. | 703/14 |
| 6,301,553 B1 | * | 10/2001 | Burgun et al. | 703/15 |
| 6,374,367 B1 | * | 4/2002 | Dean et al. | 714/37 |
| 6,389,382 B1 | * | 5/2002 | Tanaka et al. | 703/21 |
| 6,415,396 B1 | * | 7/2002 | Singh et al. | 714/38 |
| 6,567,935 B1 | * | 5/2003 | Figueroa | 714/37 |
| 2001/0014957 A1 | * | 8/2001 | Oura | 714/33 |

OTHER PUBLICATIONS

Huang et al., "An Extended Classification of Inter–instruction Dependency and Its Application in Automatic Synthesis of Pipeline Processors", 1993, IEEE, pp. 236–246.*
Huang et al., "Hardware/Software Resolution of Pipeline Hazards in Pipeline Synthesis of Instruction Set Processors", 1993, IEEE, pp. 594–599.*
Casavant, "Balancing Structural Hazards and Hardware Cost of Pipelined Processors", 1995, IEEE, pp. 562–566.*
Ho et al., "Formal Verification of Pipeline Control Usng Controlled Token Nets and Abstract Interpretation," ACM, pp. 529–536 (1998).
Levitt et al., "Verifying Correct Pipeline Implementation for Microprocessors," IEEE pp. 162–169 (1997).
Diep et al., "Systematic Validation of Pipeline Interlock for Superscalar Microarchitectures," IEEE, pp. 100–109 (1995).
Iwashita et al., "Automatic Test Program Generation for Pipelined Processors," ACM, pp. 580–583 (1994).
Bhagwati et al., "Automatic Verification of Pipelined Microprocessors," ACM, pp. 603–608 (1994).
Iwashita et al., "Integrated Design and Test Assistance for Pipeline Controllers," Fujitsu Laboratories Ltd., pp. 747–753 (1992).
Lee et al., "Functional Test Generation for Pipelined Computer Implementations," IEEE, pp. 60–67 (1991).
Yoshida et al., "A Strategy for Avoiding Pipeline Interlock Delays in a Microprocessor," IEEE, pp. 14–19 (1990).

* cited by examiner

*Primary Examiner*—Robert Beausoliel
*Assistant Examiner*—Gabriel Chu
(74) *Attorney, Agent, or Firm*—Joanna G. Chiu

(57) ABSTRACT

A method and apparatus for identifying and detecting hazards is presented. An executable specification for the architecture is compiled that includes macroarchitecture and microarchitecture information corresponding to each of the instructions supported by the architecture. A table (20) is constructed from the executable specification that specifies the particular resource utilization parameters associated with each of the instruction types included in the instruction set supported. From this table a resource utilization parameter list (30) is compiled that indicates the relative times at which resources are needed by each instruction and when these resources are released by the instruction. Comparisons between different entries in the resource utilization parameter list corresponding to the same resource are performed such that potential hazards are detected. A hazard list (200) is then compiled that includes all of the hazards detected through the comparison operations utilizing the resource utilization parameter list (30).

48 Claims, 8 Drawing Sheets

```
MOV #3, R0
ADD X:(R0), B
BNC SUB1
```
INSTRUCTION
SET 10

FIG.1

| FIELDS | INSTRUCTION: MOV #3, R0 |
|---|---|
| INSTRUCTION ID | I1 |
| MNEMONIC | MOV #X, hhh |
| ENCODING | 1101 0hhh iiii 0110 |
| ENCODING RESTRICTION | hhh!=101 |
| PROPERTY | MOV_I_R |
| CONDITION CODE | N/A |
| ADDITIONAL ENCODING WORDS | N/A |
| TOTAL ENCODING WORDS | 1 |
| NUMBER OF CYCLES TO DECODE | 1 |
| RESOURCES/TIMING | SRC(); DST(hhh_R:3) |

FIG.2

| FIELDS | INSTRUCTION: ADD X:(R0), B |
|---|---|
| INSTRUCTION ID | I2 |
| MNEMONIC | ADD X:(YYY), TT |
| ENCODING | 0111 0YYY TT11 0110 |
| ENCODING RESTRICTION | TT!=11 |
| PROPERTY | ADD_M_R |
| CONDITION CODE | CCAR |
| ADDITIONAL ENCODING WORDS | N/A |
| TOTAL ENCODING WORDS | 1 |
| NUMBER OF CYCLES TO DECODE | 1 |
| RESOURCES/TIMING | SRC(YYY=R:1, X_M;4, TT_R:2, CCR_CAR_R:2) DST(TT_R:6, CCR_CAR_R:7) |

FIG.3

| FIELDS | INSTRUCTION: BNC SUB1 |
|---|---|
| INSTRUCTION ID | I3 |
| MNEMONIC | BNC LBL |
| ENCODING | 1000 1KKK K010 1111 |
| ENCODING RESTRICTION | N/A |
| PROPERTY | CH_FLW |
| CONDITION CODE | N/A |
| ADDITIONAL ENCODING WORDS | N/A |
| TOTAL ENCODING WORDS | 1 |
| NUMBER OF CYCLES TO DECODE | 1 |
| RESOURCES/TIMING | SRC(CCR_CAR_R:1); DST() |

*FIG.4*

| ENCODING FIELD TEMPLATE | |
|---|---|
| hh | A, B, C, D |
| hhh | A, B, C, D, R0, R2, R3 |
| ⋮ | ⋮ |
| TT | A, B, R5 |
| ⋮ | ⋮ |
| YYY | R0, R1, R2, R3, R4, R5 |

*FIG.5*

| CONDITION CODE FIELD TEMPLATE | | | | |
|---|---|---|---|---|
| CC | C | Z | N | V |
| ALL | 1 | 1 | 1 | 1 |
| CAR | 1 | 0 | 0 | 0 |
| OVR | 1 | 1 | 0 | 1 |
| ⋮ | ⋮ | ⋮ | ⋮ | ⋮ |
| ZER | 0 | 1 | 0 | 0 |

*FIG.6*

| INSTRUCTION | MOV #3, R0 | ADD X:(R0), B | BNC SUB1 |
|---|---|---|---|
| INSTRUCTION ID | I1 | I2 | I3 |
| RESOURCE UTILIZATION PARAMETERS | $t_a(R0)=3$ | $t_n(R0)=1$<br>$t_n(X:(R0))=4$<br>$t_n(B)=2$<br>$t_a(B)=6$<br>$t_n(CARRY)=2$<br>$t_a(CARRY)=7$ | $t_n(CARRY)=1$ |

20

RESOURCE UTILIZATION
PARAMETER LIST 30

$I1\_t_a(R0)=3$
$I2\_t_n(R0)=1$
$I2\_t_n(X:(R0))=4$
$I2\_t_n(B)=2$
$I2\_t_a(B)=6$
$I2\_t_n(CARRY)=2$
$I2\_t_a(CARRY)=7$
$I3\_t_n(CARRY)=1$

*FIG. 9*

SORTED RESOURCE
UTILIZATION PARAMETER
LIST 40

$I2\_t_n(R0)=1$
$I3\_t_n(CARRY)=1$
$I2\_t_n(B)=2$
$I2\_t_n(CARRY)=2$
$I1\_t_a(R0)=3$
$I2\_t_n(X:(R0))=4$
$I2\_t_a(B)=6$
$I2\_t_a(CARRY)=7$

*FIG. 10*

GENERATE A TABLE OF INSTRUCTIONS AND THEIR RESPECTIVE RESOURCE UTILIZATION PARAMETERS — 52

↓

COMPILE A LIST OF EACH RESOURCE UTILIZATION PARAMETER INCLUDING A CORRESPONDING INSTRUCTION IDENTITY — 54

↓

SORT THE LIST ACCORDING TO A TIME VALUE INCLUDED WITHIN EACH RESOURCE UTILIZATION PARAMETER — 56

↓

FOR EACH RESOURCE: — 58

COMPARE TIME NEEDED PARAMETERS WITH TIME AVAILABLE PARAMETERS

↓ — 60

COMPARE TIME AVAILABLE PARAMETERS WITH TIME AVAILABLE PARAMETERS

↓ — 62

DETERMINE HAZARDS BASED ON RESULTS OF COMPARISONS

↓ — 64

COMPILE HAZARDS DETERMINED IN A HAZARD LIST

*FIG. 11*

```
┌─────────────────────────────┐
│   SCORE HAZARD GOALS LIST   │─ 72
│   USING TEST SOURCE CODE    │
└──────────────┬──────────────┘
               ▼
┌─────────────────────────────┐
│  ASSEMBLE TEST SOURCE CODE  │─ 74
└──────────────┬──────────────┘
               ▼
┌─────────────────────────────┐
│   SIMULATE PIPELINE USING   │─ 76
│    ASSEMBLED SOURCE CODE    │
└──────────────┬──────────────┘
               ▼
┌─────────────────────────────┐
│ SCORE HAZARD GOALS LIST BASED ON │─ 78
│ HARDWARE STALLS AND SOFTWARE NOPS │
└──────────────┬──────────────┘
               ▼
┌─────────────────────────────┐
│ ANALYZE SCORED HAZARD GOALS LIST │─ 80
│   TO DETERMINE OVERPROTECTION AND │
│     UNDERPROTECTION OCCURRENCES   │
└─────────────────────────────┘
```

| HAZARD ID | EXPECTED DELAY | TEST SOURCE CODE | HARDWARE STALL FIXES | NUMBER OF STALLS | SOFTWARE DELAY FIXES | SOFTWARE INDUCED DELAY |
|---|---|---|---|---|---|---|
| A | 3 | √ | √ | 3 | √ | 1 |
| B | 2 | | | | | |
| C | 2 | √ | √ | 3 | | |
| D | 3 | √ | | | √ | 3 |
| E | 4 | | | | | |
| F | 5 | √ | | | √ | 6 |
| G | 3 | √ | √ | 2 | | |
| H | 1 | √ | | | | |
| ⋮ | | | | | | |

*FIG.13*

ADDX :(R0), B    BNC SUB1
HAZARD ID=F (TOP LEVEL)
EXPECTED DELAY=5
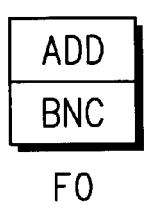
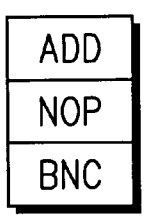
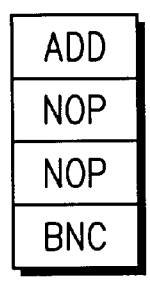
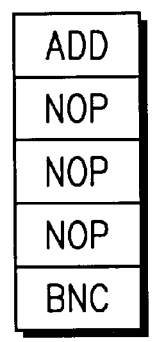
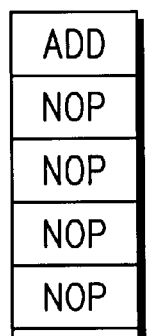
*FIG.14*

METHOD AND APPARATUS FOR PIPELINE HAZARD DETECTION

RELATED APPLICATION

This is related to application Ser. No. 09/706,090, entitled "Method and Apparatus for Generation of Pipeline Hazard Test Sequences," filed on even date and assigned to the current assignee hereof.

FIELD OF THE INVENTION

The invention relates generally to integrated circuits, and more particularly to a method and apparatus for identifying and detecting hazards.

RELATED ART

In order to maximize the utilization and throughput of a limited set of resources included in a circuit, pipelining techniques are used to move data through the circuit in an organized fashion such that different portions of the circuit are acting upon different portions of the data at the same time. Such pipelining techniques are well known in the art, and as the complexity of integrated circuits increases, the depth, or number of stages included in such pipelines is also increasing. Deep pipeline structures (those that include many stages) are included in integrated circuits such as digital signal processors (DSPs), microprocessors, microcontrollers, etc. These types of integrated circuits utilize an instruction set to determine the specific operations performed both within the pipeline and in the peripheral circuitry surrounding the pipeline.

Different instructions executed on such circuits utilize different resources within the pipeline structure. The resources utilized can include memory structures, registers, and functional units such as adders, multipliers, complex arithmetic logic units, and the like. When multiple instructions are concurrently executing within the pipeline that require the use of the same resource at the same time, hazard conditions arise. Such hazard conditions can cause errors if not eliminated, and a great deal of time and effort is typically spent during the design and debug of such integrated circuits in an attempt to eliminate all of the potential hazards that may exist.

Because of the depth of typical pipelines included in complex integrated circuits today, most techniques for detecting and eliminating hazards are limited such that some hazards may not be eliminated, or those hazards detected may be eliminated in a manner that overcompensates for the potential resource utilization conflict. As such, integrated circuits may be manufactured and marketed that either include functional bugs or suffer from lower performance due to attempts to eliminate hazards that overcompensate in their attempts to correct the potential timing issues.

Although some prior art attempts to detect hazard conditions in deep pipeline structures have been developed, these prior art attempts do not provide the flexibility, accuracy, or completeness of coverage desired. For example, detection of hazards corresponding to the use of condition codes that are often present in microcontroller and microprocessor designs are not supported in some of these prior art attempts. Other prior art attempts to detect hazards rely on automatic test program generation to create sequences of instructions that are executed to detect hazards. However, because a large number of instructions are typically supported by a microprocessor, the number of potential combinations of instructions makes complete coverage difficult to achieve using such prior art automatic test generation techniques.

BRIEF DESCRIPTION OF THE DRAWINGS

FIG. 1 illustrates an example set of instructions associated with a pipeline structure in accordance with a particular embodiment of the present invention;

FIGS. 2–4 illustrate an example of a macro/micro architecture specification table in accordance with a particular embodiment of the present invention;

FIG. 5 illustrates an encoding field template in accordance with a particular embodiment of the present invention;

FIG. 6 illustrates a condition code field template in accordance with a particular embodiment of the present invention;

FIG. 9 illustrates a resource utilization parameter list compiled based on the table included in FIG. 8 in accordance with a particular embodiment of the present invention;

FIG. 10 illustrates a sorted resource utilization parameter list derived from the resource utilization parameter list of FIG. 9;

FIG. 11 includes an illustration of a flow diagram of a method for generating a hazard list in accordance with a particular embodiment of the present invention;

FIG. 12 includes an illustration of a flow diagram of a method for analyzing a hazard list and measuring coverage of test code to cover the hazard list in accordance with a particular embodiment of the present invention;

FIG. 13 includes an illustration of a score table constructed during coverage analysis of a hazard list as it relates to a particular circuit in accordance with a particular embodiment of the present invention;

FIG. 14 provides a graphical illustration of a set of test suites determined for a particular hazard in accordance with a particular embodiment of the present invention;

DETAILED DESCRIPTION

Figures 7, 8:
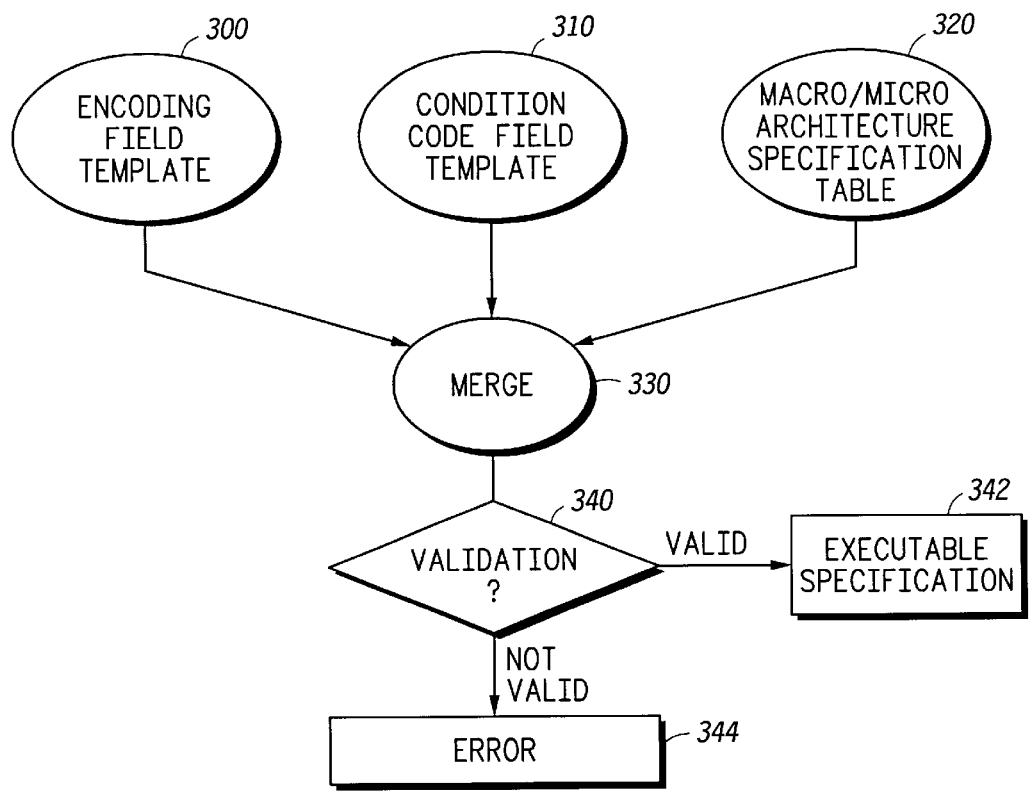
FIG. 7 illustrates a graphical representation of the operations performed to produce and evaluate an executable specification in accordance with a particular embodiment of the present invention.
FIG. 8 illustrates a table that includes the instructions of FIG. 1 and their respective resource utilization parameters as determined in accordance with a particular embodiment of the present invention.

Generally, embodiments of the present invention provide a method and apparatus for identifying hazards, detecting hazards, and measuring hazard detection quality in a pipelined data processing system. An executable specification for the architecture is compiled that includes macroarchitecture and microarchitecture information corresponding to each of the instructions supported by the architecture. A table is constructed from the executable specification that specifies the particular resource utilization parameters associated with each of the instructions included in the instruction set supported. From this table a resource utilization parameter list is compiled that indicates the relative times at which resources are needed by each instruction and when these resources are released by the instruction. Comparisons between different entries in the resource utilization parameter list corresponding to the same resource are performed such that potential hazards are detected. A hazard list is then compiled that includes all of the hazards detected through the comparison operations utilizing the resource utilization parameter list. This hazard list can then be used generate and qualify test sequences and to determine if hardware or software is overcompensating or undercompensating for the potential hazard conditions.

By compiling a list of the times at which a resource is made available and the times at which a resource is needed for all of the instructions supported in a pipelined data processing system, hazards can be detected in a manner that is linear in complexity, yet ensures exhaustive hazard detection. Such a technique takes into account both the control and data path portions of the pipeline architecture, including any condition codes utilized. The hazard list generated can be used either to refine the pipelined data processing system or to refine compilers associated with the system such that the hazards are eliminated or compensated for appropriately. As such, overprotection and underprotection of hazards detected is avoided. As such, resulting integrated circuits produced using such techniques operate more efficiently and are not subject to hardware bugs that may arise which were not detected adequately through simulation.

The invention may be better understood with reference to FIGS. 1–16. FIG. 1 illustrates an example instruction set 10 that includes three instructions that may be executed by a pipelined data processing system. Such pipelined systems may include microprocessors, microcontrollers, DSPs or other complex circuits that include multistage pipelining in order to improve operating efficiency. The example instruction set 10 is a relatively simple set of instructions that is provided in order to help illustrate the basic concepts of the techniques presented herein. It should be understood by those of ordinary skill in the art that the simplified instruction set 10 can be extrapolated to a much more complex instruction set, and the techniques provided herein can be applied to the much more complicated instruction set in a similar manner to achieve the desired hazard detection.

The operations performed by the instruction set 10 correspond to a relatively straightforward set of operations. The first instruction, MOV #3, R0, corresponds to moving a constant value of 3 into a register R0. The second instruction, ADD X:(R0), B, corresponds to adding the value stored in memory at an address stored in register R0 to a value stored in register B. Finally, the third instruction, BNC SUB1, is a branch if NOT CARRY instruction such that if the CARRY bit included in the condition codes for the pipeline is clear, a branch will occur to a subroutine (SUB1).

Because some of the instructions included in the instruction set 10 utilize registers or computation units that are affected or utilized by other instructions within the instruction set 10, hazards may exist within the pipeline of the data processing system. In order to detect these potential hazards, the resource utilization parameters associated with each of the instructions included in the instruction set 10 are determined. These resource utilization parameters may be determined based on the executable specification corresponding to the processor or other circuits that include the pipeline. The executable specification typically includes the instructions to be supported by the pipeline and the resources needed by each of those instructions.

The prior art development of an instruction set architecture specification was an intensively manual, error prone, and repetitious endeavor. Each time a modification was made to the instruction set or to the microarchitecture such that the timing or resource utilization parameters associated with the instructions were modified, a large number of manual modifications had to be made to the instruction set architecture specification. In order to avoid the manual interaction required to update the instruction set architecture specification, an executable specification is desirable.

An executable specification includes a computer readable and parsable specification that includes all of the information needed for the various operations to be performed by the pipeline. Because the executable specification includes this level of detail, there is no ambiguity with respect to the meaning or potential interpretation of different parameters or terms included in the executable specification. As such, errors associated with misinterpretation or ambiguity in prior art instruction set architecture specifications that were based strictly on the instruction set or a written macroarchitecture-level specification parameters are avoided.

In order to compile an executable specification corresponding to an instruction set of a pipelined data processing system, a predetermined set of fields are defined for each instruction type in the instruction set supported by the system as well as a number of events that may be triggered either through hardware or software related to the system. Macroarchitecture of a microprocessor, DSP, microcontroller, or the like includes an instruction mnemonic to represent an instruction type and operand types. (An example of macroarchitecture is shown in FIG. 1.) Microarchitecture of a microprocessor, DSP, micro-controller, or the like includes an instruction type encoding (e.g. an opcode), an operand encoding, encoding restrictions, condition codes and their encoding, a total number of encoding words for both opcode and operands, a number of cycles to decode, and resources utilized by the instruction with timing information. The microarchitecture may include portions of the above information, all of the above information, or more information as needed based on the instruction being analyzed. (Examples of microarchitecture information are shown in FIGS. 2, 3, 4, 5, and 6.) Thus, both microarchitecture and macroarchitecture information corresponding to each of the instruction types is included in the set of fields.

FIG. 2 illustrates an example set of fields corresponding to a first instruction type of the instruction set, MOV #3, R0. The first field shown in FIG. 2 is that corresponding to the instruction identity (ID). The instruction ID for MOV #3, R0 is I1. A second field is associated with a mnemonic for the instruction. The mnemonic represents the base format for use of the instruction when assembly code is being written. In the example illustrated, the mnemonic for the move instruction is MOV #X, hhh. The #X represents that an immediate move is to take place, where the X is associated with the value to be moved. The hhh is used to represent the particular location to which the immediate move is to store the data. Note that the hhh is used to encode a particular register of a set of potential registers. Thus, each h represents a different bit associated with the instruction, where the three bits represented by the hhh's correspond to a particular register included in a set of registers understood to correspond to an encoding based on the hhh bits. The use of such an encoding field template is described in additional detail with respect to FIG. 5 below.

The third field associated with each instruction is an encoding field, where the encoding field includes the operation code for the instruction along with any required operands. In the example illustrated in FIG. 2, the operation code is 11010 and the two operands are represented by the hhh's that define the destination register, as well as iiii's that indicate the immediate value to be moved by the instruction. The remaining bits in the encoding field are either unused or reserved for other purposes associated with the instruction.

The fourth field is an encoding restriction field, where the encoding restriction may be used to indicate whether there are specific restrictions associated with one or more of the encodings associated with the instruction. In the example illustrated in FIG. 2, the encoding restriction indicates that the hhh value cannot be equal to a 101 binary encoding. Thus, even though the hhh's may be used to represent a 101 binary encoding for other instructions, for this particular instruction such an encoding is disallowed. For example, if the 101 encoding represents a register R3, the move instruction shown in FIG. 2 is not allowed to move an immediate value into register R3.

The fifth field is a property field, where the property field can be used to determine the type or general character of the operation performed when the instruction is executed. For example, the instruction illustrated in FIG. 2 is an instruction associated with moving data. As such, the entry in its property field reflects that a data move operation occurs.

In some cases, sets of fields will be included in the executable specification that correspond to events rather than to specific instructions. For such event field sets, the property field may indicate that the event corresponds to a hidden instruction or other type of event other than a user instruction, such as a hardware interrupt. As such, the field set can quickly be recognized as a field set corresponding to something other than a user instruction such that the various parameters are understood in the proper context. In general, an instruction at the microarchitecture level could be a microarchitecture event or a user instruction at the microarchitecture level. Because the property field is mainly provided to allow a user to visually comprehend the various entries in the executable specification, it may be omitted in some embodiments.

The condition code field indicates which, if any, of the condition codes for the pipeline are affected as a result of the execution of the instruction. Although MOV #3, R0 does not perform any modification of the condition codes, and therefore a non-applicable (N/A) entry is included in that field, other instructions may use a different encoding scheme to encode the particular condition codes which they modify or may modify through execution. One example is illustrated in FIG. 3, which is described in additional detail below.

The additional encoding words field indicates whether the instruction requires an additional operation code (op code) word, where the additional op code word may be a prefix word or a suffix word. The total encoding words field indicates how many total words are used to encode the instruction. Thus, in the example illustrated, there are no additional encoding words associated with the instruction, and therefore the total number of coding words is equal to 1. If a prefix or suffix word, or both, are associated with an instruction, the total number of encoding words will be greater than 1.

The next field indicates a number of cycles required to decode the instruction. For many instructions, the number of cycles required for decoding may be equal to 1. However more complex instructions may require additional decoding time, and therefore this field reflects the total number of cycles required to decode such instructions. The number of cycles required to decode field is also useful for field sets associated with events, where the events may result in a time period during which decoding of subsequent instructions is disallowed. For example, there may be an event associated with preparing the system to enter a fast interrupt condition. Such preparation may include the movement of data between various registers associated with the pipeline, and as such, decoding of additional instructions may be disallowed during the time period required to move this data between the registers. In a particular example, three cycles may be required to perform these movement operations. In such an example, the number of cycles to decode field may be set to 3 such that no additional decoding of instructions occurs while the preparations to enter the fast interrupt condition are occurring.

The resources/timing field indicates the various resources that are utilized when the instruction is executed. These resources include both source and destination resources. Source resources are associated with resources utilized to fetch data, addresses, or the like. Destination resources are those resources within which a result is stored by the instruction, or may also include condition code registers or other registers that include status bits that are modified through the execution of the instruction. For the instruction illustrated in FIG. 2, the move operation is an immediate move, and as such no source data is required from any corresponding resources. The data to be moved is embedded in the encoding associated with the instruction. As such, the source resources portion of the field, SRC( ), is empty.

The destination portion, DST ( ), of the resources/timing field for the instruction of FIG. 2 is shown to include an entry corresponding to the destination register at which the immediate data is stored as a result of the move operation. Note that the encoding described above with respect to the register definition is employed such that a particular register is not necessarily specified in the field set for the instruction. The encoding also includes an "_R" portion that indicates that the resource corresponds to a register resource. Register resources can include control registers, temporary registers, and general purpose registers. In other cases, the encoding may include an "_M" portion that indicates a memory resource. Memory resources can include data memory and program memory.

In other embodiments, additional encoding portions, such as an "_L" may be used to indicate various modes of operation in which the various pipeline stages may be operating. For example, the _L may represent a late mode with respect to the variable pipeline stage architecture (variable pipeline length), where the late mode increases the timing associated with the various resources by a predetermined delay, such as one or more cycles. As is apparent to one of ordinary skill in the art, other modes associated with other types of pipeline operation or structuring may be included in the various resources/timing field entries in order to allow flexibility using a uniform encoding.

The destination portion also includes timing information associated with the storage of the immediate value in the register defined by the hhh encoding. In the particular example illustrated, the destination field portion indicates that the data will be stored in the register indicated by the hhh's three cycles following the time the instruction enters the instruction decoding stage. Thus, the timing information may be measured from a predetermined point in time. In some embodiments, the predetermined point in time is the initiation of the decoding of the instruction, and the timing information is measured in a number of cycles from this point. As will be described later, the specific definition of the various resources utilized and their respective timing information allows for the microarchitecture of the pipeline to be well understood. This leads to the ability to perform very detailed timing analysis with respect to the pipeline such that the hazards included in the pipeline architecture can be pinpointed and their proper resolution verified.

FIG. 3 illustrates a field set corresponding to a second instruction type, ADD X:(R0), B. As is shown, this instruction has an instruction ID I2. The mnemonic for instruction I2 includes two encodings. A first encoding, YYY, encodes the identity of a register from which an address is determined, where the data stored at that address represents the first operand for the add operation. The second encoding, TT, encodes the register at which the second operand is stored, where the result of the addition operation is also stored at this location.

The encoding field for the instruction I2 includes the encodings for both the register at which the address is stored (YYY) as well as the register identity at which the second operand and result are stored (TT). The encoding restriction field indicates that one of the potential encodings for TT (i.e. "11") is invalid. The property field indicates that this is an addition instruction that utilizes both memory and a register, and the condition code field indicates that at least one of the condition codes may be affected as a result of the execution of this instruction. The condition code field includes the encoding CAR. As was the case with the encodings for the various registers described above and detailed in FIG. 5 below, a field template is also used to resolve the encodings associated with condition codes. The condition code field template is illustrated and described in additional detail with respect to FIG. 6 below. As was the case with the instruction I1, instruction I2 does not include any additional encoding words, and also only requires a single cycle to decode.

The resources/timing field for the instruction I2 includes a number of resources and their respective timing information. The source portion of the resources/timing field indicates the various resources from which data or other information is required for execution of the instruction within the pipeline. As is shown, the register encoded by YYY is required one cycle following the initiation of decoding of the instruction I2. Similarly, a value from the memory location, which is determined based on the address retrieved from the register encoded by YYY, is required four cycles after the decoding stage has been entered. The contents of the register encoded by TT are also required two cycles following the entrance to the decoding stage.

The final entry in the source portion of the resources/timing field is a particular bit location within the condition code register. As is known, the condition code register (CCR) typically includes a number of bits associated with different conditions that may have been resolved by the execution of a previous instruction. Some examples include a carry bit being set, a zero result being determined, a negative result being determined, and an overflow result being determined. These individual conditions are merely representative of a small number of conditions that may be maintained within a particular data processing system. As is apparent to one of ordinary skill in the art, additional conditions may exist within the condition code register that reflect other states used in the execution of instructions.

In order to resolve which particular bit or bits located within the condition code register are required for execution of the instruction, an additional encoding (CAR) is provided within the entry in the source portion of the resources/timing field. The encoding included in the source portion of the resources/timing field for the instruction I2 indicates that the carry bit is required for execution of the instruction I2. This encoding is described in greater detail with respect to FIG. 6 below. The "_R" indicates that this is a resource associated with a register, and the ":2" indicates that this resource must be valid and available two cycles after the decoding stage is entered for the instruction I2.

The destination portion of the resources/timing field for the instruction I2 indicates that a result is stored in the register encoded by TT. Furthermore, this result is valid and available for use by other instructions executing six cycles following the entrance into the decoding stage of the instruction I2. Similarly, the destination field indicates that the carry bit may be modified by execution of the instruction I2, and such a modification is valid seven clock cycles following the initiation of instruction decoding.

FIG. 4 indicates fields associated with the third instruction type, BNC SUB1, included in the instruction set shown in FIG. 1. The third instruction has, an instruction ID of I3. The mnemonic for the instruction includes a label (LBL). The label is represented with the encoding field by KKKK. The property field indicates that the instruction will cause a change in flow (CH_FLW), and some of the remaining fields indicate that there are no encoding restrictions, the condition codes are not modified, and the instruction is a single word instruction that only requires one cycle to decode.

The resources/timing field associated with the instruction I3 does not include any entries in the destination portion, as no registers or memory locations associated with the data processing system are modified as a result of execution of the instruction. However, as is indicated by the source portion of the resources/timing field, the carry bit within the condition code register must be valid one cycle following the initiation of decoding of the instruction I3 in order to determine whether or not the branch should be taken.

FIG. 5 illustrates an encoding field template 300 that is used to resolve the various encodings associated with the registers included in the system. As was described with respect to instruction I1 in FIG. 2, the hhh encoding can be used to encode a number of different specific registers. The encoding field template 300 indicates that the encoding hhh can be used to determine any particular register from a set of registers that includes the registers A, B, C, D, R0, R2, and R3. For example, if the three bits associated with the hhh encoding are all equal to 0, this may encode the register A. Similarly, if all of the bits are high (equal to 1), this may encode the register R3.

If four or fewer registers need to be encoded, two encoding bits may suffice. For example, the encoding hh may be used to encode any one of the registers A, B, C, and D. Because different instructions may have different potential registers associated with either source data locations or destination data locations, the encoding field template 300 may include a significant number of encodings. For example, in order to provide enough encodings to support an instruction set that includes on the order of 600 instructions, thirty different encoding entries may be required in the encoding field template 300. Although only a portion of the potential encodings are illustrated in the encoding field template of FIG. 5, the registers associated with the encodings TT and YYY that were utilized by instruction I2 are also provided.

As is apparent to one of ordinary skill in the art, the variety of potential registers used by the various instructions included in the instruction set determines the number of encoding entries required. By providing the encoding scheme illustrated in FIG. 5, an orthogonal instruction set is not required. Thus, various registers can be associated with various instructions in a flexible manner that was not typically supported in prior art orthogonal instruction sets.

FIG. 6 illustrates a condition code field template 310 that can be used to flexibly encode the various combinations of condition code bits that may be utilized or modified by various instructions. The condition codes (CCs) supported by the condition code field template 310 include the carry condition code (C), the 0 condition code (Z), the negative condition code (N), and the overflow condition code (V).

The ALL encoding indicates that all of the condition codes included in the condition code register are to be used or may be modified by the instruction utilizing such an encoding. The CAR encoding indicates that only the carry bit is to be utilized or modified. Similarly, the OVR encoding indicates that all but the negative bit are to be utilized or may be modified, whereas the ZER encoding indicates that only the 0 bit is to be utilized or modified. As is apparent to one of ordinary skill in the art, in a system that supports a larger number of condition codes in the condition code register, additional encodings may be utilized to provide maximum flexibility in terms of individual instruction condition code utilization.

FIG. 7 illustrates a graphical representation of the operations performed to produce and evaluate an executable specification 342. In order to generate a valid executable specification 342, the encoding field template 300, the condition code field template 310, and the macro/micro architecture specification table 320 are merged by a merging block 330. The macro/micro architecture specification table 320 is a table that includes all of the sets of fields corresponding to all of the instructions and events supported by the pipelined data processing system. The merging block 330 resolves the encodings included in the various field sets utilizing the encoding field template 300 and the condition code field template 310 to produce an executable specification.

Validation of the executable specification produced by the merging block 330 can be performed to ensure that no errors have occurred in the generation of any of the components merged to produce the executable specification. Such validation can include consistency checks as well as determinations as to missing references or references that are not utilized as expected. If the validation block 340 determines that an invalid executable specification has resulted, an error 344 is determined, where such an error determination can result in debugging of one or more of the components merged.

Once the validation block 340 has determined that a valid executable specification 342 has been produced, the valid executable specification 342 can be parsed and processed by a computer system to generate a number of useful results. In some embodiments, the results can include testing code used in the verification of circuits or circuit models that include the pipelined data processing system. In other embodiments, the results can include information for the verification of software tools, such as assemblers, that are used in association with circuits or circuit models that include the pipelined data processing system.

One of the uses of the executable specification is in the generation of a hazard list for the pipelined data processing system. It should be noted that the procedures described with respect to FIGS. 11, 12, and 15 below may be performed more efficiently through the use of an executable specification, but such an executable specification is not required to perform these procedures. Without an executable specification, much more manual interaction is necessary when updates to the instruction set architecture specification are performed. Also, the executable specification may be used for a variety of other applications aside from those described herein.

FIG. 8 illustrates a table 20 that includes the various resource utilization parameters corresponding to each of the instructions included in the instruction set 10. The table 20 can be derived from the executable specification automatically, as the executable specification is configured to allow for computer parsing and processing. Furthermore, all of the information included in the table 20 can be derived from the executable specification. The top row of the table 20 lists the specific instruction, the second row indicates the corresponding instruction ID assigned to each of the instructions, and the third row lists all of the resource utilization parameters corresponding to each of the instructions.

As stated above, the instruction I1 (MOV #3, R0) is a relatively simple instruction that moves the constant value of 3 into register R0. The resource utilization parameters corresponding to I1 are equally simple. The movement of the constant value into register R0 dictates that the register R0 does not contain the constant value until a specified time period following the decoding of the instruction I1. Thus, the time after which the register R0 contains the desired constant value and is available for use by another operation is equal to three cycles. This is expressed by the equation $t_a(R0)=3$. In this equation, $t_a$ represents the time available resource utilization parameter, and the value (R0) indicates that the time available corresponds to the register R0. The number on the right of the equal sign indicates the number of cycles after the instruction enters the decoding stage that the contents of register R0 is available. All of this timing information can be derived from the microarchitecture information included in the resources/timing field of the field set for the instruction included in the executable specification.

As described above, the instruction I2 corresponds to an addition operation that fetches data from memory and adds that data with additional data stored within another register, register B. As can be seen from the table 20, there are many more resource utilization parameters associated with instruction I2 than were associated with instruction I1. Specifically, there are a number of resource utilization parameters corresponding to times at which the addition instruction needs specific registers or condition codes to be valid and ready for use.

The first resource utilization parameter listed is $t_n(R0)=1$, where $t_n$ represents that the resource utilization resou at which a specific resource is needed. In this case, the resource is the register R0, and the time at which this resource is needed corresponds to a time one cycle following initiation of decoding of the instruction I2. As is apparent to one of ordinary skill in the art, in order to perform the add function included in instruction I2, the data to be added must be present and valid in its expected locations. In order to fetch the data located at the memory address corresponding to the value stored within the register R0, the address indicated by the value in the register R0 must first be valid. As such, the contents of the register R0 must be valid, which is what the first resource utilization parameter indicates. Thus, the address for the add operation must be stored with the register R0 and ready for use one cycle following initiation of decoding of the instruction I2.

The other resources corresponding to instruction I2 that have time needed resource utilization parameters are the memory location indicated by the address stored in register R0, the register B (which provides the other operand for the add operation), and the carry bit included in the set of condition codes.

The time available resource utilization parameters associated with the second instruction I2 include a parameter corresponding to the B register, which stores the result produced by the add operation. Another time available parameter is included for the carry condition code bit, which indicates if the add resulted in a carry out condition. As is shown in the table 20, the result is available in the register B six cycles following decoding of the instruction I2, and the carry bit in the condition code will be valid seven cycles following decoding.

Note that the instruction I2 requires that certain data be present in certain resources at certain times in order to execute. In contrast, the instruction I1 does not read or fetch data from any locations as a part of its execution. Thus, the first instruction I1 does not have any time needed resource utilization parameters associated with it. Similarly, instruction I3 (BNC SUB1) does not result in new data being stored in any resources and therefore there are no time available resource utilization parameters associated with this instruction. The only resource utilization parameter associated with instruction I3 is the time at which the conditional branch instruction requires the carry bit within the condition code register to be valid such that it can determine whether or not to perform the branch operation.

FIG. 9 illustrates a resource utilization parameter list 30 that may be derived from the table 20 illustrated in FIG. 2. The resource utilization parameter list 30 includes all of the resource utilization parameters for each of the instructions included in the instruction set 10. Each resource parameter included in the resource utilization parameter list 30 includes the corresponding resource that is utilized and an instruction identity that indicates to which instruction the particular use corresponds. For example, the first resource utilization parameter listed in the resource utilization parameter list 30 is $I1\_t_a(R0)=3$, in which the corresponding resource is the register R0 and the instruction identity is I1. Similarly, the second resource utilization parameter $I2\_t_n(R0)=1$ is another resource utilization parameter corresponding to the resource R0, but this resource utilization parameter corresponds to the instruction I2.

FIG. 10 illustrates a sorted resource utilization parameter list 40, where the sorted resource utilization 40 includes all the entries in the resource utilization parameter list 30 of FIG. 9 where the entries have been sorted based on the time in descending order associated with each resource utilization parameter. Thus, those resource utilization parameters having the smallest time value (e.g. 1 in the example shown in FIG. 10) are at the head of the list. (Alternate embodiments may sort the list in ascending order.) Also note that in other embodiments the sorted resource utilization parameter list may also sort the various resource utilization parameters based on the particular resource to which each resource utilization parameter corresponds. For example, all of the resource utilization parameters corresponding to the carry condition code may be included in a grouping, where within the grouping, the various resource utilization parameters corresponding to the carry condition code are sorted based on their associated timing information.

Once the sorted resource utilization parameter list 40 of FIG. 10 has been compiled, comparisons are performed between the various resource utilization parameters included in the list to determine if hazard conditions exist between various instructions. For example, for a particular resource such as the register R0, there may be a number of entries in the sorted resource utilization parameter list 40. One of those entries corresponds to the time available associated with the register R0 corresponding to the instruction I1. As is shown, this time available is equal to three cycles following initial decode of the instruction I1. Also associated with the resource R0 is a time needed corresponding to the instruction I2 where the time at which the register R0 is needed by I2 is one cycle following decode.

Thus, if the instruction I1 is decoded during a first cycle and the instruction I2 is decoded in the immediately following cycle, the register R0 is not available in time for the instruction I2 based on the time available resource utilization parameter that corresponds to the instruction I1. As such, the instruction I2 must to be stalled in hardware or no-operation (NOP) instructions must be inserted in the assembly code between the instructions I1 and I2 in order to ensure enough delay such that the data placed in register R0 by instruction I1 is available when instruction I2 requires it. If enough delay is not inserted, an incorrect value that is still stored in register R0 from a previous operation may be used for instruction I2.

Thus, by comparing pairs of resource utilization parameters stored within the sorted resource utilization parameter list 40, comparison results that indicate whether or not particular hazards can be selectively determined within the pipelined data processing system can be produced. The comparison must adjust the time needed and time available comparison based on the expected times at which the various instructions are decoded. Because two instructions are not decoded and executed simultaneously in a typical single pipeline architecture, the appropriate number of clocks between instructions must be included in the comparison operation performed. In a multiple pipeline system where two instructions can commence execution simultaneously, no such delay between instructions is required for comparisons between instructions that start executing at the same time in different pipelines. As is apparent to one of ordinary skill in the art, instructions executing in different pipelines may compete for the use of common resources such as registers, memory, and the like.

For example, if one cycle is expected to separate two sequentially executed instructions, a time available associated with the first instruction must be reduced by one cycle when being compared with a time needed for a subsequent instruction. (Note that this example assumes there is no conflict when a resource is read after written (RAW) within one clock cycle.) If a first instruction has a time available resource utilization parameter of 3 with regard to a particular register and a second instruction has a time needed resource utilization parameter associated with that register having a time value of 2, the data will be valid and available within the register at the time the second instruction requires it. This is because the second instruction does not commence executing until one cycle following the initiation of execution of the first instruction, and thus the time value of 3 with respect to execution of the first instruction corresponds to a time value of 2 with respect to the initiation of execution of the second instruction.

The comparison between the two resource utilization parameters may produce comparison result that indicates the presence of multiple hazards. For example, if a first instruction has a time available resource utilization parameter corresponding to a particular resource that is equal to six, and another instruction has a time needed resource utilization parameter associated with the same resource that has a time value of 1, multiple hazard conditions are determined.

A first hazard exists if the two instructions are executed sequentially one cycle apart. This is apparent as the resource does not become available with respect to the time of execution of the first instruction until five cycles following initiation of execution of the second instruction. The second instruction needs that resource one cycle after it commences execution. In order for a hazard not to occur with regard to this resource and these two instructions, the second instruction cannot initiate execution until at least five cycles after the first instruction begins executing.

The comparison result derived from comparing the resource utilization parameters can thus be compared, with a predetermined threshold. If the comparison result is greater than the predetermined threshold, one or more hazards are determined. The comparison result can also define a violation window, where the violation window indicates at least one spacing between the instructions that results in a hazard. As such, for the example provided above, hazards exist if the second instruction is executed one cycle following the first instruction, two cycles following the first instruction, three cycles following the first instruction, and four cycles following the execution of the first instruction. Thus, four hazards are determined with respect to these two instructions and the particular resource for which the resource utilization parameters have been compared.

The hazards discussed in detail in the examples thus far include read-after-write (RAW) hazards where such RAW hazards concern the availability of data for a subsequent operation that needs that data. Another type of hazard is write-after-read (WAR) hazards where such WAR hazards cause data to be overwritten prior to being utilized, e.g. read. A third type of hazard is write-after-write (WAW) hazards, where the problem with WAW hazards is in that data may be overwritten by subsequent instruction before it is utilized. WAW hazards can be determined by comparing the time available resource utilization parameter for one instruction with the time available resource utilization parameter for a second instruction, where the two resource utilization parameters correspond to the same resource. This corresponds to the equation $t_{a(first\ instruction)} - t_{a(second\ instruction)} > t_{pw}$ where $t_{pw}$ represents the predetermined threshold associated with the comparison. The predetermined threshold, which may also be referred to as a pipeline violation window, may be equal to one if two different instructions are sequentially executed and the number of cycles required for decoding of the second instruction is equal to one. In other embodiments, the predetermined threshold may be greater than one if the spacing between the instructions is more than one cycle (e.g. if the second instruction takes more than one cycle to decode).

Note that the predetermined threshold associated with the comparison of resource utilization parameters may vary depending on whether the comparison is directed toward detecting hazards between instructions (inter-instruction hazards) or hazards within a particular instruction (intra-instruction hazards). For inter-instruction hazards, the predetermined threshold may be equal to one for sequential instructions, whereas for intra-instruction hazards, the predetermined threshold may be equal to zero.

The comparisons between resource utilization parameters are repeated for each of the resources included in the sorted resource utilization parameter list 40. Note that similar comparison operations can be performed on the resource utilization parameter list 30 of FIG. 9 such that the sorting operations performed to produce the sorted resource utilization parameter list 40 may not be required in every embodiment. However, the lack of sorting may increase the time required to perform the comparison operations such that the time is no longer linear with respect to the size of the list.

Once all of the hazards have been detected for the various combinations of instructions included in the instruction set 10, a hazard list may be compiled that includes all of the hazards detected through the comparison operations.

FIG. 11 illustrates a flow diagram corresponding to the various steps that may be performed to produce a hazard list based on a micro/macro-architecture instruction set or executable specification for a particular data processing system. At step 52, a table of instructions and their respective resource utilization parameters is generated. Step 52 may correspond to the generation of the table 20 illustrated in FIG. 8.

At step 54, a list that includes all of the resource utilization parameters is compiled, where the resource utilization parameters included in the list generated at step 54 include a corresponding instruction identity. The list generated a step 54 may correspond to the resource utilization parameter list 30 illustrated in FIG. 9.

At step 56, the list produced at step 54 is sorted according to a time value included within each resource utilization parameter to produce a sorted resource utilization parameter list, which may correspond to the resource utilization parameter list 40 illustrated in FIG. 10. As stated earlier, the sorting performed at step 56 may also include sorting based on resource such that the resource utilization parameters for each resource are grouped and then sorted by time value.

Once a resource utilization parameter list has been generated, a number of steps 58–64 are performed for each resource. At step 58, time needed parameters for the resource are compared with time available parameters corresponding to the resource. As described earlier, such comparisons may be used to detect RAW and WAR hazards that may be present in the pipelined data processing system being examined. At step 60, time available parameters for the resource are compared with other time available parameters for the same resource such that potential WAW hazards can be detected.

At step 62, the results of the comparison operations performed at step 58 and 60 are used to determined hazards that may be present in the system. Note that in some embodiments, only step 58 may be performed such that only RAW and WAR hazards are detected. In other embodiments, WAW hazards may be the concern, and as such only the comparison operations included in step 60 may be performed.

Once the hazards have been determined at step 62, they may be compiled into a hazard list at step 64. This hazard list may be used in subsequent processing operations that validate test source code or determine whether or not adequate protection against occurrences of these hazards is provided.

FIG. 12 illustrates a flow diagram corresponding to a method for utilization of the hazard list generated for measuring pipeline verification quality evaluation or for measuring functional coverage. The method begins at step 72 where the hazard list, or hazard goals list, that includes all of the hazards detected using the method of FIG. 11 (or using other methods) is scored using test source code. The test source code may correspond to a set of instructions that are used to either exercise the circuit either in a simulated environment (i.e. test a circuit model) or on an actual tester using an integrated circuit that includes a pipeline to be tested. The test source code utilized at step 72 may be manually generated test source code or automatically generated test source code. Selective scoring of the hazard goals list using the test source code allows for a determination as to how many of the hazards included in the pipeline should be detected through the execution of the test source code within the pipeline.

At step 74, the test source code is assembled using an assembler to produce assembled source code. The assembler may have knowledge of some of the hazards that exist within the pipeline structure, and as such may insert software delays such as NOP instructions between instructions that, if executed without the software delays, cause a hazard condition to exist. Thus, some of the hazards may be corrected by software during assembly. Hazards corrected in this way may be referred to as software delay fixes. Intra-instruction pipeline hazards cannot be corrected by the insertion of additional delay by software.

At step 76, the circuit, or pipeline included within the circuit, is simulated using the assembled test code produced at step 74. Such simulation monitors stall conditions within the circuitry as the source code is executed such that hardware induced stalls that avoid hazard conditions are detected. Thus, hazards that may exist within the test source code may be avoided either through software delay fixes where NOPs or similar instructions may be inserted to provide the delay required to allow data to become available when needed, whereas in other cases hardware may stall certain portions of the pipeline to provide the delay required.

At step 78 the hazard goals list is scored based on at least the hardware stalls detected during the simulation at step 76. Scoring the hazard goals list may include placing values in specific fields that are included within the hazard goals list. FIG. 13 illustrates an example hazard goals list that may be used in conjunction with the method of FIG. 12.

The hazard goals list 200 illustrated in FIG. 13 includes a hazard identification field (row) corresponding to each of the hazards that is known to exist for the circuitry being tested. Thus, entries in the first column of the hazard goals list 200 identify a particular hazard that is known to exist.

The second column of the hazard goals list 200 indicates an expected delay associated with each of the hazards included in the list. The expected delay corresponds to the amount of delay that must be inserted between instructions, or between operations within a single instruction, in order to avoid the hazard to which the expected delay corresponds. For example, the first hazard, hazard A, is shown to have an expected delay of 3. Thus, if three software NOPs are inserted between the instructions corresponding to hazard A, the hazard is avoided. Similarly, if hardware stalls execution of the second instruction corresponding to hazard A by three cycles, the expected delay is met, and the hazard is avoided.

The third column included in the hazard goals list 200 corresponds to the test source code evaluation. The third column includes an indication (in the form of a checkmark or lack thereof in FIG. 13) that indicates whether or not each hazard is detected by exercising the circuit using the test source code. For the example illustrated in FIG. 8, the test source code is capable of detecting hazards A, C, D, F, G and H. However, the test source code is unable to detect hazards B and E, which are known to exist based on the hazard list compiled. When the simulation is performed at step 76 of FIG. 12, hazards B and E are not expected to be detected.

Scoring the hazard goals list at step 78 of FIG. 12 based on the simulation performed at step 76 may be performed by including an indication in an additional field corresponding to stalls detected. In general, stalls may include both hardware stall fixes and software delay fixes. In some embodiments, a single field may be included in the hazard, goals list to account for both hardware stall fixes and software delay fixes. Such a stall field may include a checkmark when the stalls detected during simulation at step 76 correspond to the execution of instructions corresponding to a particular hazard. Thus, if a stall is detected during the execution of the instructions corresponding to hazard A, a checkmark is included in the stalls field.

In the hazard goals list 200 illustrated in FIG. 13, the stalls field is separated into a hardware stalls fixes field and a software fix field (software delay fixes). As such, differentiation between those hazards that are fixed using software delays and those that are fixed using hardware stalls is performed. If during the simulation at step 76 a set of hardware stalls is detected that is associated with a set of instructions corresponding to a particular hazard, the hardware stall fixes field is scored. If software NOP instructions, or other software delays are detected corresponding to a particular set of instructions that are known to constitute a hazard, an indication is placed in the software delay fixes field to flag that a software fix has been detected corresponding to that hazard.

Returning to FIG. 12, at step 80 the scored hazards goals list is analyzed to determine overprotection and underprotection occurrences within the circuit. A simple case of underprotection can be determined if a particular hazard exists that should be detected by the test source code but which does not cause the inclusion of hardware stalls or software delays. An example is shown in the hazard goals list 200 of FIG. 13. The hazard H is shown to be detected by the test source code, but no indications are present in the hardware stall fixes field or the software delay fixes field indicating that hardware stalls or software delays were detected during simulation. As such, the hazard H is not protected for by the assembler or the hardware. This is a clear case of underprotection, and detecting it can allow for corrective action prior to releasing the design to manufacturing or prior to releasing parts to customers such that devices that include bugs are not manufactured or sold.

Other cases of underprotection exist when the number of delays introduced either by software or hardware is inadequate to meet the needs of the particular hazard. In order to allow for ready determination of such occurrences of underprotection where not enough delay is included, additional fields that indicate the amount of delay introduced by hardware and software for a particular hazard may be included in the hazard goals list 200. As is shown, the hazard goals list 200 includes a number of stalls fields and a software induced delay field. The number of stalls field indicates the number of stalls or amount of delay introduced by hardware through the insertion of stalls during simulation. The software induced delay field indicates the number of NOPs, or similar delay-inducing instructions inserted by software during assembly to avoid the hazard condition.

Thus, when the hazard goals list is scored at step 78, such scoring may include determining a number of hardware stalls if a hardware stall fix is detected and scored. This number of hardware stalls can then be entered into the number of stalls field such that the amount of delay induced by hardware can be evaluated. Similarly, if a software delay fix is detected and scored, the amount of software induced delay may be determined and entered into the software induced delay field to allow for further analysis. Specifically, this further analysis can include the determination as to overprotection and underprotection occurrence based on the amount of delay introduced.

In one example illustrated in the hazard goals list 200 of FIG. 13, the hazard C has an expected delay of 2 cycles. The hazard C is shown to be a detected by the test source code, and is also shown to be compensated for by hardware through the insertion of hardware stalls. This is indicated by the checkmark in the hardware stall fixes field. The number of stalls field indicates that hardware has inserted three stalls to compensate for the hazard condition. However, the expected delay was only two cycles, and as such, overprotection has occurred. Because hardware can alleviate the hazard condition by only inserting two stalls, the insertion of three stalls constitutes overprotection, and may result in an overall reduction in the speed and efficiency of the circuit operation.

A similar case of overprotection occurs for the hazard F. Hazard F is shown to have an expected delay of five cycles, and the hazard goals list 200 indicates that the hazard F is fixed via a software delay fix. However, the software-induced delay corresponding to the software delay is six cycles, where only five cycles of delay is required. As such, overprotection has once again occurred.

Another type of overprotection exists when both hardware and software attempt to alleviate a hazard condition. For example, hazard A is shown to be fixed by both hardware and software, as is indicated by the entries in the hardware stall fixes field and the software delay fixes field. Because correction is attempted in both hardware and software and the total amount of delay induced by hardware and software exceeds the expected delay, overprotection has once again occurred. Such overprotection is undesirable as it can slow down the speed with which the circuit can operate. Once the analysis at step 80 of FIG. 12 has been performed, modifications can be made to either the hardware or the software included in the assembler to ensure that overprotection and underprotection occurrences are reduced or eliminated. As such, the resulting circuit and accompanying assembler can operate at peak efficiency without the inclusion of bugs that may corrupt pipeline operations.

In order to quickly identify specific bugs associated with particular hazards that have been identified based on the hazard identification techniques described above, different types of circuit simulation or stimulation can be utilized. The techniques utilized may depend on the knowledge of the microarchitecture of the pipeline and its relationship to the various instructions for which hazard conditions are determined to exist. This information can be exploited to quickly determine whether or not the expected operations are occurring within the pipeline with the corresponding amount of delay induced by either wait states or software inserted NOPs.

FIG. 14 provides a graphical illustration of a set of test suites determined for a particular hazard ID. The hazard ID is that associated with the performance of the BNC SUB1 instruction following the execution of the ADD X:(R0), B instruction. As was described above, the branch instruction requires the carry bit included in the condition code register to be valid one cycle following the initiation of decoding of the branch instruction. The ADD instruction performs an operation that can modify the carry bit included in the condition code register, and that modification may occur such that the validity of that bit is not assured until seven cycles following the initiation of decoding of the ADD instruction. Because it takes each instruction one cycle to decode, the expected delay required to avoid a hazard condition between the initiation of decoding of these two instructions is five cycles. Thus, if four NOP operations are inserted between the two instructions, an inadequate delay has been included and a hazard condition will still exist. Note that this is true for any number of NOPs less than five.

In the example illustrated in FIG. 14, the hazard ID for this sequence of instructions may include a top level that indicates the sequence of instructions to which the hazard corresponds as well as a lower level, which indicates the particular hazard that is a subset of the total set of hazards associated with the top level hazard ID. Thus, the hazard ID F0 corresponds to the hazard associated with executing the two instructions back-to-back without any NOPs inserted between the instructions. Similarly, the hazard ID F4 is associated with a hazard that may occur when the second instruction is executed after the first instruction with four NOPs interspaced between the two instructions. Note that this assumes that a NOP operation requires one cycle to execute.

In order to optimize the determination as to whether the hardware and software associated with the pipeline are properly resolving the potential hazard conditions presented by various instruction combinations, a multistage simulation may be used that quickly pinpoints bugs in the initial stage while allowing for more thorough verification at each subsequent stage. In one embodiment, a two-stage examination takes place prior to any full scale evaluation occurring. During the first pass, or first stage, a course evaluation of the operation with respect to potential hazard conditions occurs.

Figure 15:
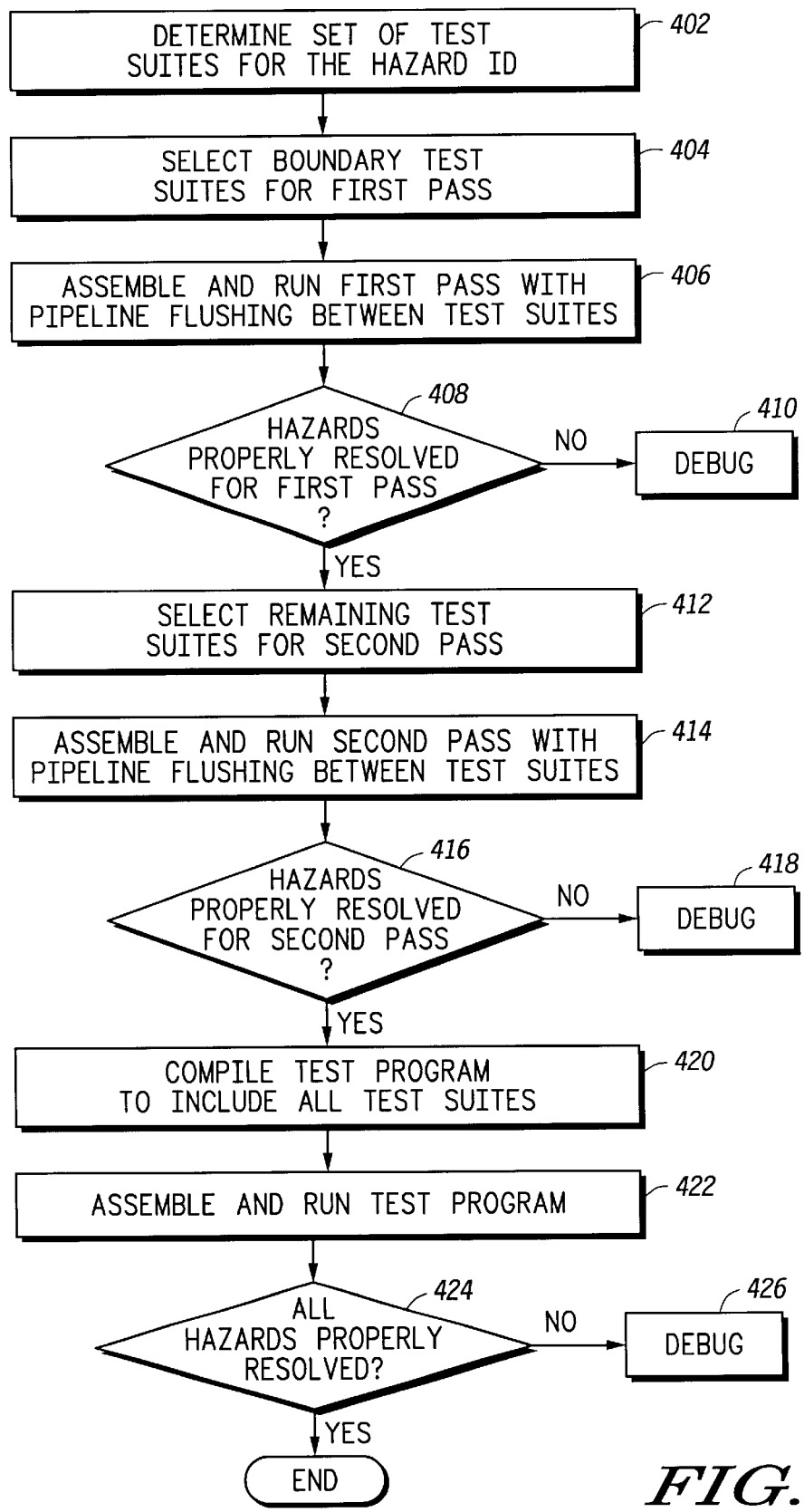
FIG. 15 illustrates a flow diagram of a method for generating test code and evaluating resolution of hazard conditions in a pipeline in accordance with a particular embodiment of the present invention.

FIG. 15 illustrates a flow diagram that indicates the multiple stages of evaluation as well as the final evaluation operation. At step 402, a set of test suites for a particular hazard ID is determined. Note that a set of test suites is preferably determined for all of the hazard IDs that have been determined for the particular instruction set and pipeline system to be evaluated. The flow diagram provided in FIG. 15 is directed towards a particular hazard ID, and it should be understood that such operations are preferably repeated for all hazard IDs. Note that multiple steps corresponding to different hazard IDs may be performed in parallel such that the steps associated with assembling test suites and exercising the system may be performed together such that the evaluation of the system is performed in an efficient manner.

The set of test suites determined for the hazard ID at step 402 is preferably similar to the various instruction sequences that correspond to the individual multilevel hazard IDs shown in FIG. 14. Thus, the set of test suites for hazard ID F will include a first test suite that includes the ADD instruction immediately followed by the BNC instruction. A second test suite causes the BNC instruction to be executed following a single NOP operation that is interspersed between the ADD instruction and the BNC instruction. The last test suite in the set corresponds to the execution of the BNC instruction following four NOPs interspersed between the BNC operation and the ADD operation.

If any of the test suites result in a hazard condition, the overall system has not adequately resolved the potential hazard situation. In some embodiments, the entire set of test suites may be used to exercise the system during a thorough test. However, such thorough testing at an early stage is potentially inefficient, as bugs present in the software or hardware may flag errors for a number of test suite code sets corresponding to each hazard, thus complicating the testing of the system. As such, the testing may be divided into multiple stages.

In a multistage testing system, the method proceeds from step 402 to step 404 where boundary test suites are selected for a first pass associated with a first stage of testing. The boundary test suites are those test suites associated with the minimum and maximum delay that may be inserted between the potentially hazard causing instructions that result in a hazard still existing. Thus, for hazard ID F, the boundary test suites will include test suite corresponding to hazard ID F0 (lower delay boundary) and a test suite corresponding to ID F4 (upper delay boundary). These test suites represent the minimum and maximum delay inserted between the instructions for the hazard that will still result in a hazard condition if hardware and software do not properly resolve the potential hazard condition. As such, these test suites provide a first level of screening that may be useful in rapidly determining any bugs present in the system.

At step 406, the test suites selected at step 404 are assembled to produce assembled code. This assembled code is then run during a first pass, where the first pass may include additional instructions between the various test suites such that it is ensured that the pipeline is flushed between the execution of each of the individual test suites. Such pipeline flushing can help to ensure that residual data existing within the pipeline does not cause any hazard detection that is not directly associated with the hazards expected for the particular instruction sequences included in the test suites. In other words, isolation of each of the test suites as it proceeds through the pipeline ensures that any bugs detected are directly related to the particular test suite currently executing.

Note that in other embodiments, more rapid execution of the test suites can be performed without performing the pipeline flushing. However, this may deter the ease with which the various bug sources are determined.

In order to ensure that the test suites execute under controlled and desirable conditions, a predetermined environment may be set up prior to executing each test suite. For example, the pipelined data processing system can be configured to an initial state such that the late mode is used in the pipeline. In other cases, the condition codes in the condition code register may be set to an initial state such that proper execution of the instructions included in the test suites occurs. For example, the zero bit in the condition code register may have to be cleared before a particular test suite is executed in order to ensure the execution of the test suite produces the desired results. As such, execution of the test suite may include initializing this bit in the condition code register to zero.

In some instances, the configuration of the predetermined environment for a test suite can result in the removal of the hazard corresponding to the test suite. In such instances, the test suite is preferably removed from the set of test suites, as it does not represent a true hazard condition that can be detected or corrected.

At step 408, it is determined whether or not the hazards have been properly resolved during the first pass testing. The determination as to whether the hazards are properly resolved can include the detection of inserted NOPs by software as well as stall conditions in hardware corresponding to the execution of the test suite. The determination as to proper resolution of the hazards may also include a determination as to whether a minimum required delay has been provided by the software and hardware such that no overprotection has occurred. Similarly, the amount of delay inserted can determine whether or not the hardware and software have adequately protected against hazards such that no underprotection has occurred. Note that the determination at step 408 may also include a determination as to whether the operations expected to be performed by the instructions included in the test suite have in fact occurred.

If it is determined at step 408 that the hazards have not been properly resolved during the first pass, the method proceeds to step 410. At step 410, debugging operations occur such that the software or hardware that is not properly resolving the hazard condition is repaired. Thus, if underprotection has been detected, the system is modified to ensure that adequate delay is inserted between the instructions associated with the hazard. Similarly, if overprotection has been detected, the unnecessary extra delay included that may result in a slow down in the operation of the pipeline is removed. Thus, the debugging that occurs at step 410 ensures that the pipeline operates at peak efficiency. Once debugging at step 410 has been completed, steps 402–408 may be repeated until the first pass is satisfactorily completed.

If it is determined at step 408 that the test suites tested during the first pass were properly resolved, the method proceeds to step 412. At step 412, the remaining test suites included in the set of test suites for the particular hazard being addressed are selected for a second pass. The second pass utilizes test suites that include an intermediate amount of delay in comparison with those used in the first pass. Thus, for the hazard ID F illustrated in FIG. 14, test suites corresponding to hazard identifies F1, F2, and F3 are selected for the second pass.

At step 414, these test suites are assembled to produce assembled code. Once again, the assembly of these test suites may include insertion of additional NOP instructions that cause the pipeline to be flushed between each test suite execution. As described above, this may aid in the isolation of particular bugs detected during the second pass. Following assembly, the system is tested using the resulting assembled code.

At step 416, it is determined whether all of the hazards suites tested during the second pass were properly resolved. Because the hazards associated with the first pass were properly resolved, the likelihood that one of the hazards included in the set exercised during the second pass is not properly resolved is significantly reduced. However, if it is determined at step 416 that one or more of the hazards was not properly resolved during the second pass exercising, the method proceeds to step 418. At step 418, debugging operations similar to those performed at step 410 are performed.

Following these debugging operations, it may be desirable to return to step 402 such that any modifications made during the debugging operation at step 418 are tested through the coarser first pass testing prior to additional exercising during a second pass operation. However, in other cases the modifications made during debugging at step 418 may be such that the method may simply return to step 412 and repeat the second pass testing operations. Thus, if it is determined that the debugging that occurred at step 418 may affect the hazards associated with the boundary test suites, the method may return to step 402 to ensure that these boundary test suites are once again used to exercise the system. However, if the debugging that occurs at step 418 does not affect the boundary test suites, returning to step 412 may be adequate.

Once all of the test suites have been used to exercise the system and have been determined to be properly resolved, a final test program, or test suite compilation, is compiled at step 420 that fully exercises the system in an exhaustive manner. Thus, all of the test suites developed for testing the system are compiled into a single test program. Preferably, this test program does not include the NOPs used to flush the pipeline between test suites that may have been utilized at steps 406 and 414. This ensures that any simultaneousexecution hazard conditions are properly resolved by software or hardware. It also ensures that the testing that utilizes the compiled test program can occur more rapidly than would be possible if the pipeline were flushed between each test suite included in the compiled test program. This may be desirable at the final stage of testing, which is exhaustive and therefore would require a significant period of time if the pipeline were continuously flushed.

At step 422 the test program is assembled. The resulting assembled code is run, where this may include executing the assembled code on a model of the device or utilizing the assembled code to control a tester that is testing an integrated circuit.

At step 424 it is determined whether or not all of the hazards that were determined using the executable specification have been properly resolved by the hardware and software in the system. If it is determined that all of the hazards have been properly resolved, the method is completed and a verified design or product is the result. If however one or more hazards is determined to be unresolved by the hardware or software, the method proceeds to step 426 where additional debugging operations are performed. Following such debugging operations, the testing utilized to verify the modifications may include the first pass, the second pass, the final fully compiled test program, or any combination thereof. Thus, depending upon the debugging performed, various levels of subsequent testing may be required to ensure that the objective of the debugging was achieved.

Figure 16:
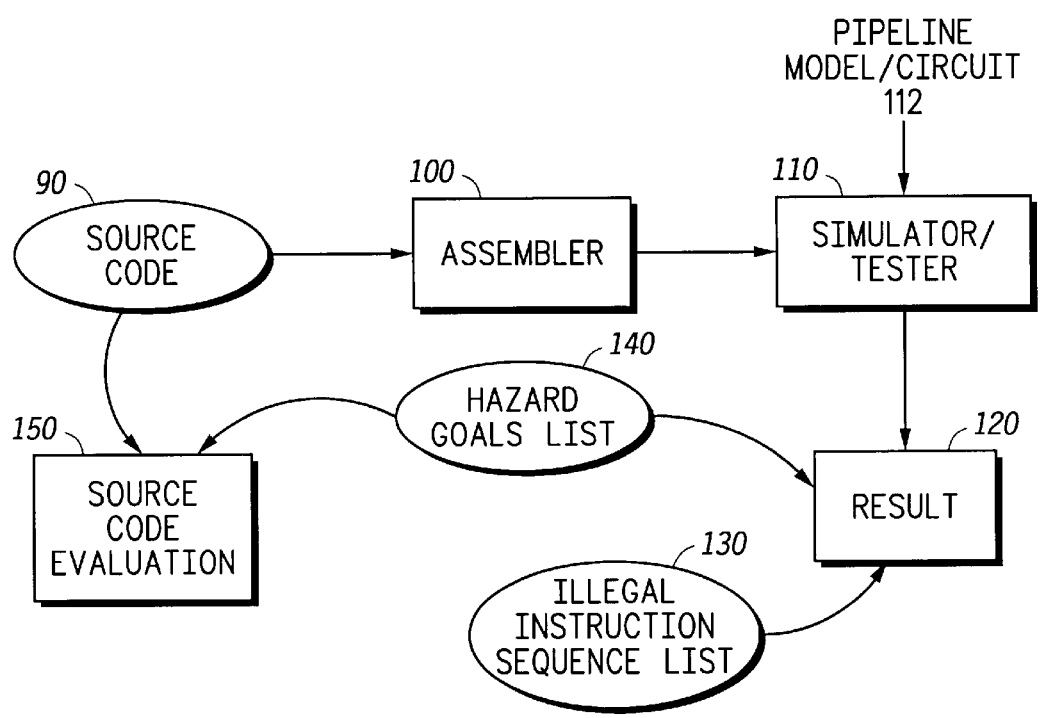
FIG. 16 includes a graphical representation of the various components utilized in coverage analysis of hazard detection and circuit verification in accordance with a particular embodiment of the present invention.

FIG. 16 illustrates a graphical representation of the various components of the pipeline evaluation system. A source code evaluation block 150 receives the source code 90 and the hazard goals list 140. The source code evaluation block 150 scores the source code such that the hazard goals list 140 includes an indication as to which of the hazards included in the hazards goals list should be detected through execution of the source code 90.

The assembler 100 receives the source code 90 and assembles the source code 90 to produce assembled source code that is provided to the simulator/tester 110. The simulator/tester 110 also receives a pipeline model or circuit 112 for evaluation. Thus, in some embodiments, the simulator/tester block 110 may represent a simulation that exercises a model of the pipeline being tested. In other embodiments, the simulator/tester block 110 may be an actual tester that tests a physical circuit that includes the pipeline structure to be evaluated.

The results compiled within the result block 120 are based on the hazard goals list 140 and the results of the simulation for testing performed by the simulator/tester block 110. The results may be modified based on an illegal instruction sequence list 130 that lists different illegal instruction sequences that are not allowed to occur in the particular circuit being evaluated. For example, there may be hazards associated with the pipeline structure that appear to be detected through the execution of certain instructions included in the source code 90. However, because these sequences of instructions may not be allowed (they constitute an illegal instruction sequence), the hazard is not truly being detected based on the source code after assembly. This is because the source code may be converted by the assembler into a different sequence of operations such that the expected operations from the instructions in the source code are not truly performed. As such, the hazard may appear to be being monitored, but in fact it is not. As such, the illegal instruction sequence list 130 can allow for further evaluation of the results produced by the result block 120 to ensure that no false hazard detection or evaluation is in fact occurring.

The various methods and techniques described herein (such as those illustrated in FIGS. 7, 11, 12, and 15) may be implemented in software executing on a processor. Such software is stored in a computer readable medium, and the software includes a plurality of instructions that, when executed, cause the processor to perform the functions included in the method or technique. The processor is operably coupled to the computer readable medium and retrieves the plurality of instructions for execution. Such software may be embodied on one or more of computer hard disks, floppy disks, 3.5" disks, computer storage tapes, magnetic drums, static random access memory (SRAM) cells, dynamic random access memory (DRAM) cells, electrically erasable (EEPROM, EPROM, flash) cells, nonvolatile cells, ferroelectric or ferromagnetic memory, compact disks (CDs), laser disks, optical disks, and any like computer readable media.

The techniques for detecting and evaluating hazard conditions in pipielined data processing systems may be useful to design and validation engineers in the initial design of the pipeline structure and in debugging operations. Furthermore, test source code generated for testing the pipeline either during simulation or in post-fabrication testing can also be evaluated to ensure that adequate coverage of the expected hazards is achieved. Additional optimization can be achieved by recognizing the potential for overprotection and underprotection of hazards within the pipeline, and, based on the results produced through the evaluation techniques described above, eliminating such overprotection and underprotection occurrences. This ensures that the operating speed of the pipeline is not compromised and bugs or other errors resulting from hazards are not allowed to propagate into manufactured devices.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for generating a hazard list, comprising:
   compiling a list of resource parameters, including a first resource utilization parameter and a second resource utilization parameter, wherein each resource parameter has a corresponding resource and instruction identity;
   for at least one resource in the list, comparing the first resource utilization parameter to the second resource utilization parameter to obtain a first comparison result, wherein the first and second utilization parameters correspond to the at least one resource; and selectively determining a hazard based on the first comparison result, wherein if the first comparison result is greater than a predetermined threshold, the hazard is determined, and wherein the predetermined threshold has a first value if a first instruction identified by the instruction identity corresponding to the first resource utilization parameter is different from a second instruction identified by the instruction identity corresponding to the second resource utilization parameter, and the predetermined threshold has a second value if the first instruction and the second instruction is a same instruction.

2. The method of claim 1, wherein the resources are used within a data processing system and the instruction identity identifies the instruction using the corresponding resource.

3. The method of claim 2, wherein the resources include at least one of a register and a functional unit.

4. The method of claim 1, wherein the hazard corresponds to a pipeline within a data processing system.

5. The method of claim 1, further comprising sorting the list of resource parameters.

6. The method of claim 1, wherein the list of resource parameters further includes a third resource utilization parameter corresponding to the resource, the method further comprising:

comparing the second resource utilization parameter to the third resource utilization parameter to obtain a second comparison result, and selectively determining a second hazard based on the second comparison result.

7. The method of claim 6, wherein the first resource utilization parameter includes a time needed value for the resource, and the second and third resource utilization parameters include time available values for the resource.

8. The method of claim 1, wherein the first value is different from the second value.

9. The method of claim 1, wherein if the hazard is determined, the first comparison defines a violation window, wherein:

the violation window indicates at least one spacing between a first instruction identified by the instruction identity corresponding to the first resource utilization parameter and a second instruction identified by the instruction identity corresponding to the second resource utilization parameter, and the hazard is caused at least in part by the at least one spacing.

10. The method of claim 1, wherein the resource parameters further include a third and a fourth utilization parameter, the method further comprising:

for a second resource in the list, comparing the third resource utilization parameter to the fourth resource utilization parameter to obtain a second comparison result, wherein the third and fourth resource utilization parameters correspond to the second resource; and selectively determining a second hazard based on the second comparison result.

11. The method of claim 10, further comprising compiling the hazard list based on the hazard and the second hazard.

12. A method for generating a hazard list, comprising:

compiling a list of resource parameters, including a first resource utilization parameter and a second resource utilization parameter, wherein:

each resource parameter has a corresponding resource and instruction identity, the first resource utilization parameter includes a time needed value for the resource, and the second resource utilization parameter includes a time available value for the resource, and the time needed value is calculated relative to when an instruction identified by the instruction identity corresponding to the first resource utilization parameter is decoded, and the time available value is calculated relative to when an instruction identified by the instruction identity corresponding to the second resource utilization parameter is decoded;

for at least one resource in the list, comparing the first resource utilization parameter to the second resource utilization parameter to obtain a first comparison result, wherein the first and second utilization parameters correspond to the at least one resource; and selectively determining a hazard based on the first comparison result.

13. A method for generating a hazard list, comprising:

compiling a list of resource parameters, including a first resource utilization parameter and a second resource utilization parameter, wherein each resource parameter has a corresponding resource and instruction identity, wherein compiling the list of resource parameters includes utilizing an executable specification, wherein the executable specification comprises:

a plurality of entries wherein each of the plurality of entries corresponds to one instruction type within the instruction set, and wherein each of the plurality of entries comprises:

macroarchitecture information corresponding to the one instruction type;

microarchitecture information corresponding to the one instruction type, wherein the microarchitecture information corresponding to the one instruction type includes resource information indicating a resource capable of being accessed by the instruction type; and at least one of a cycle field to indicate the number of cycles the instruction type remains in a pipeline decode stage and an additional word field to indicate at least one of a prefix and a suffix for use as an additional encoding word for the instruction type;

for at least one resource in the list, comparing the first resource utilization parameter to the second resource utilization parameter to obtain a first comparison result, wherein the first and second utilization parameters correspond to the at least one resource; and selectively determining a hazard based on the first comparison result, wherein if the first comparison result is grater than a predetermined threshold, the hazard is determined.

14. The executable specification of claim 13, wherein the resource information indicates a plurality of resources capable of being accessed by the instruction type.

15. The executable specification of claim 13, wherein the resource includes at least one of a register and a memory.

16. The executable specification of claim 15, wherein the register includes at least one of a control register, a temporary register, and a general purpose register.

17. The executable specification of claim 15, wherein the memory includes at least one of a data memory and a program memory.

18. The executable specification of claim 15, wherein the resource information further includes source and destination information.

19. The executable specification of claim 18, wherein the source and destination information identifies the resource as at least one of a source and a destination for the instruction type.

20. The executable specification of claim 19, wherein the microarchitecture information further includes timing information for the resource, wherein the timing information defines when the resource is accessed by the instruction type as measured from a predetermined point in time.

21. The executable specification of claim 20, wherein the predetermined point in time refers to an instruction decoding stage of the pipelined data processing system, and the timing information includes the number of cycles as measured from the instruction decoding stage.

22. The executable specification of claim 20, wherein the pipelined data processing system is characterized as a variable pipeline length architecture, and wherein the microarchitecture information further includes a late mode indicator that indicates a predetermined delay to he added to the timing information.

23. The executable specification of claim 13, wherein each entry further includes a condition code field to indicate a condition code affected by the instruction type.

24. A method of analyzing a hazard list having at least one hazard identification field, comprising:
   using test code to score the hazard list, the hazard list including an expected delay field, a hardware fix field, a software fix field, a number of stalls field, and an amount of delay field, each corresponding to the at least one hazard identification field;
   assembling the test code to produce assembled test code;
   simulating a circuit having a pipeline, using the assembled test code to monitor stalls, wherein the stalls include hardware stalls and software delays corresponding to the pipeline; and
   scoring the hazard list based on the stalls, wherein scoring the hazard list based on the stalls comprises selectively scoring the hardware fix field and selectively scoring the software fix field in response to simulating the circuit to monitor the stalls.

25. The method of claim 24, wherein the hazard list further includes a test code field and a stalls field corresponding to the at least one hazard identification field.

26. The method of claim 24, wherein the circuit is a circuit model.

27. The method of claim 24, wherein the hardware fix field is scored if a hardware stall corresponding to the hazard identification field occurs during simulating the circuit.

28. The method of claim 24, wherein the software fix field is scored if a software delay corresponding to the hazard identification field occurs during simulating the circuit.

29. The method of claim 24, further comprising:
   determining a number of hardware stalls if the hardware fix field is scored and entering the number of hardware stalls into the number of stalls field; and
   determining an amount of software induced delay if the software fix field is scored and entering the amount of software induced delay into the amount of delay field.

30. The method of claim 24, further comprising:
   determining at least one of an overprotection and an underprotection occurrence based on the hazard list after scoring the hazard list based on the stalls.

31. The method of claim 30, further comprising using an illegal instruction sequence list at least in part to determine the at least one of the overprotection and the underprotection occurrence.

32. The method of claim 30, wherein if both the hardware fix field and the software fix field are scored, an overprotection occurrence is indicated.

33. The method of claim 30, wherein the hazard list further includes a test code field corresponding to the at least one hazard identification field, and if the test code field is scored and neither the hardware fix field nor the software fix field is scored, an underprotection occurrence is indicated.

34. The method of claim 30, wherein if the number of stalls field indicates a value greater than the expected delay field, an overprotection occurrence is indicated, and if the number of stalls field indicates a value less than the expected delay field, an underprotection occurrence is indicated.

35. The method of claim 30 wherein if the amount of delay field indicates a value greater than the expected delay field, an overprotection occurrence is indicated, and if the amount of delay field indicates a value less than the expected delay field, an underprotection occurrence is indicated.

36. The method of claim 24, further comprising generating the hazard list prior to using the test code to score the hazard list.

37. The method of claim 36, wherein generating comprises:
   compiling a list of resource parameters, including a first resource utilization parameter and a second resource utilization parameter, wherein each resource parameter has a corresponding resource and instruction identity;
   for at least one resource in the list, comparing the first resource utilization parameter to the second resource utilization parameter to obtain a first comparison result, wherein the first and second utilization parameters correspond to the at least one resource;
   selectively determining a hazard based on the first comparison result; and
   including the hazard in the hazard list if the hazard is determined.

38. The executable specification of claim 24, wherein the instruction type includes a hidden instruction that corresponds to a pipeline event.

39. The executable specification of claim 38, wherein the hidden instruction is not a user instruction.

40. The executable specification of claim 38, wherein the hidden instruction includes a hardware interrupt.

41. The executable specification of claim 24, wherein the executable specification is in a computer readable format.

42. A computer readable medium, comprising:
   a first plurality of instructions for compiling a list of resource parameters, including a first resource utilization parameter and a second resource utilization parameter, wherein each resource parameter has a corresponding resource and instruction identity;
   a second plurality of instructions for comparing the first resource utilization parameter to the second resource utilization parameter to obtain a first comparison result for at least one resource in the list, wherein the first and second utilization parameters correspond to the at least one resource; and
   a third plurality of instructions for selectively determining a hazard based on the first comparison result, wherein if the first comparison result is greater than a predetermined threshold, the hazard is determined, and wherein the predetermined threshold has a first value if a first instruction identified by the instruction identity corresponding to the first resource utilization parameter is different from a second instruction identified by the instruction identity corresponding to the second resource utilization parameter, and the predetermined threshold has a second value if the first instruction and the second instruction is a same instruction.

43. The computer readable medium of claim 42, wherein the resource parameters further include a third resource utilization parameter corresponding to the resource, the computer readable medium further comprising:

a fourth plurality of instructions for comparing the second resource utilization parameter to the third resource utilization parameter to obtain a second comparison result, wherein selectively determining the hazard is performed based on the first and second comparison results.

44. The computer readable medium of claim 42, wherein:

the computer readable medium includes a plurality of computer readable media; and each of the first, second, and third plurality of instructions is stored on at least one of the plurality of computer readable media.

45. The computer readable medium of claim 42, wherein the first value is different from the second value.

46. A computer readable medium for analyzing a hazard list having at least one hazard identification field, comprising:

a first plurality of instructions for scoring the hazard list, the hazard list including an expected delay field, a hardware fix field, a software fix field, a number of stalls field, and an amount of delay field, each corresponding to the at least one hazard identification field;

a second plurality of instructions for assembling the test code to produce assembled test code;

a third plurality of instructions for simulating a circuit having a pipeline, using the assembled test code to monitor stalls, wherein the stalls include hardware stalls and software delays corresponding to the pipeline; and a fourth plurality of instructions for scoring the hazard list based on the stalls, wherein scoring the hazard list based on the stalls comprises selectively scoring the hardware fix field and selectively scoring the software fix field in response to simulating the circuit to monitor the stalls.

47. The computer readable medium of claim 46, wherein:

the computer readable medium includes a plurality of computer readable media; and each of the first, second, third, and fourth plurality of instructions is stored on at least one of the plurality of computer readable media.

48. The computer readable medium of claim 46, further comprising:

a fifth plurality of instructions for determining at least one of an overprotection and an underprotection occurrence based on the hazard list after scoring the hazard list based on stalls.

* * * * *